Figures 1, 2:
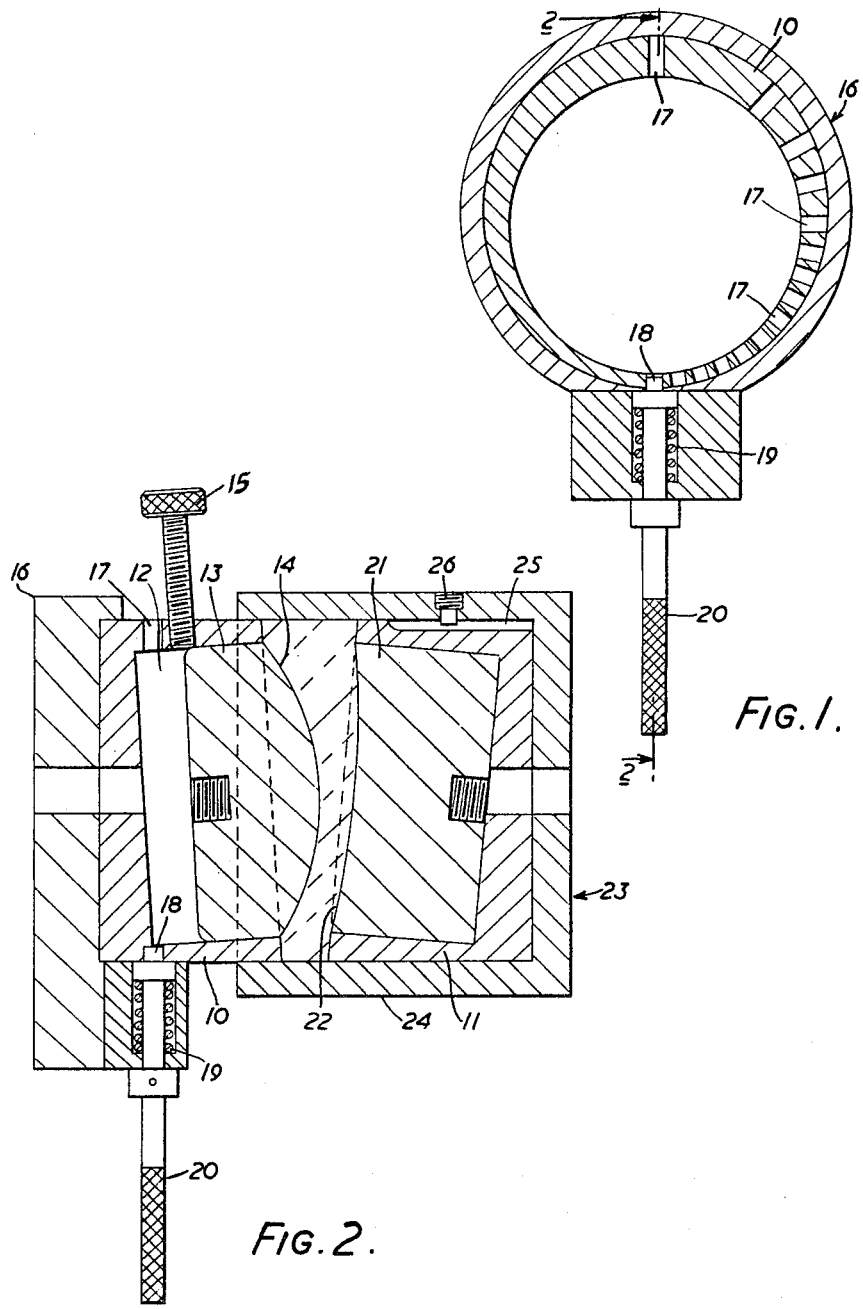

Sept. 20, 1966     C. H. CRADDOCK     3,273,204

MOLD FOR THE MANUFACTURE OF LENSES

Filed Nov. 18, 1963

INVENTOR
C. H. Craddock
BY
ATTORNEY 3,273,204
MOLD FOR THE MANUFACTURE OF LENSES
Charles Henry Craddock, Wexham, Slough, England, assignor to Combined Optical Industries Limited
Filed Nov. 18, 1963, Ser. No. 324,535
Claims priority, application Great Britain, Nov. 19, 1962, 43,621/62
4 Claims. (Cl. 18—34)

This invention relates to the manufacture of lenses and is more particularly concerned with the manufacture of molded ophthalmic prism lenses.

A prism lens is a lens in which the axes of the opposed curved faces are not aligned so that the lens is thicker at one end of a diameter than at the other. The degree of misalignment of the axes is hereinafter referred to as the "amount of prism."

In the production of prism lenses by molding plastics material, it has hitherto been necessary to use a different molding tool for each different amount of prism it is required to obtain and this has complicated and added to the cost of the manufacture of molded prism lenses. We have now developed a lens molding tool which can be used to make molded prism lens with a range of amounts of prism.

According to the present invention we provide a lens molding device which comprises two die housings which during molding are brought together along a common axis, each housing having a bore for the reception of a lens molding die, the axis of which bore is offset in relation to said common axis and one of the housings being mounted in a frame for rotation about said common axis whereby the angle between the axes of the bores in the die housings, and hence between the axes of dies positioned therein, can be varied by rotation of said housing in the frame.

A preferred embodiment of the lens molding device will now be described, by way of example only, with reference to the accompanying drawing, in which:

FIGURE 1 is a cross-section of the device through the rotatable die housing, and FIGURE 2 is a section on line 2—2 of FIGURE 1.

As shown in FIGURE 2, the device includes two substantially cylindrical die housings 10 and 11 arranged on a common axis and each housing having a cylindrical die-receiving bore, the axis of which is offset from the common axis.

The bore 12 of the first housing 10 receives a die 13 having a convex lens-shaping surface projecting axially from the bore of the housing; the die 13 is retained in the housing 10 by means of a locking screw 15. The housing 10 is mounted for rotation about the common axis in a frame 16 and by means of a plurality of radial holes 17 lying in a plane normal to the common axis and a locking pin 18 mounted on the frame 16, the housing 10 may be locked in any one of a number of angular positions relative to the frame 16.

The locking pin 18 is spring loaded towards its locking position by means of a compression spring 19 and is provided with an axial extension 20 which enables the locking pin to be withdrawn from its locking position to allow rotation of housing 10 in the frame 16.

The bore of the second housing 11 receives a die 21 having a concave lens-shaping surface 22. The housing 11 is positioned in a frame 23 which includes a hollow cylindrical portion 24 surrounding, and forming a sliding fit with, the housing 11. The housing 11 is provided on its outside with an axially extending groove 25 and the angular position of the housing 11 relative to the frame 23 is fixed by means of a set screw 26 in the frame; the set screw 26 does not engage the base of the groove 25 and thus allows axial movement between the housing 11 and the frame 23.

The interior of the hollow cylindrical portion 24 also forms a sliding fit with the periphery of the rotatable housing 10; it will be appreciated that the fit between the housing 10 and 11 and the interior of the cylindrical portion 24 serves to prevent any substantial escape of the plastics material during molding.

The amount of prism produced in a lens molded in this device will depend upon the relative angular positions of the two housings 10 and 11. The minimum amount of prism obtainable is equal to the difference between the offset angle between the axis of the bore of one die housing and the common axis and the offset angle between the axis of the bore of the other die housing and the common axis and the maximum amount of prism obtainable is equal to the sum of these two offset angles, this range of amounts of prism being obtainable by rotating the rotatable die housing through 180°. In the particular case of the two offset angles being the same, it is possible to vary the amount of prism from zero to double the offset angle.

Whilst in the embodiment described, the die 13 has a convex lens-shaping surface and the die 21 has a concave lens-shaping surface, it will be apparent that a die having a plane or concave lens-shaping surface can be used in place of the die 13 and a die having a plane or convex lens-shaping surface can be used in place of the die 21. The dies shown in the drawing also have spherical lens-shaping surfaces and it will be apparent that one or both dies may have a surface other than a simple spherical curve, that is any desired kind of curvature depending upon the type of lens to be manufactured.

The lens molding device according to the invention will normally be used for the manufacture of prism lenses by compression molding, the latter being carried out by inserting a preheated, preshaped disc of transparent moldable plastics material between the dies and bringing the dies together under pressure. During the molding operation the device is heated, conveniently by steam or electrically. The device according to the invention can equally be used for the manufacture of lenses by casting.

I claim:

1. A lens molding device which comprises two die housings which during molding are brought together along a common axis, each housing having a bore for the reception of a lens molding die, the axis of which bore is offset in relation to said common axis, and one of the housings being mounted in a frame for rotation about said common axis whereby the angle between the axes of the bores in the die housings, and hence between the axes of dies positioned therein, can be varied by rotation of said housing in the frame.

2. A lens molding device according to claim 1, in which the outside of the rotatable die housing forms a sliding fit with the inside of a second frame in which the other die housing is positioned, the latter die housing being prevented from rotation relative to the second frame.

3. A lens molding device according to claim 2, in which the second frame is provided with a set screw which is adapted to co-operate with an axially extending groove on the outside of the die housing positioned in the second frame to prevent rotation of said die housing relative to the second frame.

4. A lens molding device according to claim 1, in which the periphery of the rotatable die housing is provided with a plurality of holes lying in a plane normal to the common axis and the frame in which said die housing is mounted is provided with a locking pin adapted to co-operate with said holes to secure said die housing in any one of a number of relative angular positions with respect to said frame.

(References on following page)

References Cited by the Examiner

UNITED STATES PATENTS

| | | |
|---|---|---|
| 2,479,935 | 8/1949 | Johnson. |
| 2,635,289 | 4/1953 | Owens _____ 18—42 X |
| 2,823,417 | 2/1958 | Pasini et al. |

FOREIGN PATENTS 512,138   1/1955   Italy.

J. SPENCER OVERHOLSER, *Primary Examiner.*

J. H. FLINT, *Examiner.*